United States Patent

Naito et al.

[11] Patent Number: 5,968,430
[45] Date of Patent: Oct. 19, 1999

[54] PROCESS FOR PRODUCING AN EXPANSION-MOLDED ARTICLE

[75] Inventors: Masato Naito, Kanuma; Takashi Kitahama, Utsunomiya; Keigo Narita, Utsunomiya; Ryou Kikusawa, Utsunomiya, all of Japan

[73] Assignee: JSP Corporation, Tokyo, Japan

[21] Appl. No.: 08/995,163

[22] Filed: Dec. 19, 1997

[30] Foreign Application Priority Data

Dec. 24, 1996 [JP] Japan .................................. 8-355665

[51] Int. Cl.$^6$ .................................................. B29C 43/22
[52] U.S. Cl. ........................... 264/126; 264/51; 264/101; 264/321
[58] Field of Search .................... 264/321, 46.2, 264/126, 51, 101

[56] References Cited

U.S. PATENT DOCUMENTS

| | | |
|---|---|---|
| Re. 27,994 | 4/1974 | Berner . |
| 3,037,897 | 6/1962 | Pelley . |
| 3,065,500 | 11/1962 | Berner . |
| 3,312,760 | 4/1967 | Berner . |
| 3,408,690 | 11/1968 | Jacob . |
| 3,427,372 | 2/1969 | Berner . |
| 3,471,610 | 10/1969 | Sadek ...................................... 264/321 |
| 3,501,558 | 3/1970 | Munters et al. . |
| 3,526,556 | 9/1970 | Berner . |
| 3,594,461 | 7/1971 | Jacob . |
| 3,674,387 | 7/1972 | Gonon . |
| 3,709,651 | 1/1973 | Rivat-Lahousse . |
| 3,767,744 | 10/1973 | Holl . |
| 3,773,876 | 11/1973 | Rath et al. ............................. 264/46.2 |
| 3,800,018 | 3/1974 | Charpentier . |
| 3,832,106 | 8/1974 | Rivat-Lahousse . |
| 3,832,429 | 8/1974 | Charpentier . |
| 3,853,972 | 12/1974 | Berner . |
| 3,863,908 | 2/1975 | Charpentier . |
| 3,888,608 | 6/1975 | Holl . |
| 3,895,086 | 7/1975 | Berner . |
| 3,971,838 | 7/1976 | Yazawa . |
| 3,986,918 | 10/1976 | Berner . |
| 3,992,501 | 11/1976 | Tatzel et al. . |
| 4,279,847 | 7/1981 | Assarsson et al. . |
| 4,379,107 | 4/1983 | Berner . |
| 4,417,932 | 11/1983 | Brietscheidel et al. . |
| 4,432,713 | 2/1984 | Berner . |
| 5,091,133 | 2/1992 | Kobayashi et al. ..................... 264/126 |
| 5,180,628 | 1/1993 | Haardt et al. ........................... 264/321 |

FOREIGN PATENT DOCUMENTS 2 029 374  12/1971  Germany .................................. 264/126

*Primary Examiner*—Allan R. Kuhns
*Attorney, Agent, or Firm*—Sherman and Shalloway

[57] ABSTRACT

Disclosed herein is a method for continuously producing an expansion-molded article, comprising feeding foamed particles between a belt continuously traveling along the upper surface within a passageway defined by structural members and having a rectangular form in section and a belt continuously traveling along the lower surface within the passageway, and then causing the foamed particles to successively pass through a super heated steam-feeding region and a cooling region within the passageway. The foamed particles used are foamed particles of a polyolefin resin, in which a recovery factor from compression defined by the equation (1):

Recovery factor from compression (%)=$V_2/V_1 \times 100$  (1)

wherein $V_1$ is the original bulk volume of the foamed particles, and $V_2$ is a bulk volume of the foamed particles measured upon elapsed time of 10 seconds after the foamed particles are compressed to a bulk volume of 60% on the original bulk volume, and the compressive force is then removed, is at least 80%. The foamed particles are transferred to the super heated steam-feeding region after the foamed particles are compressed on the upstream side of the super heated steam-feeding region, and then released from a part or the whole of the compression. An apparatus for producing the expansion-molded article is also disclosed.

17 Claims, 4 Drawing Sheets

PROCESS FOR PRODUCING AN EXPANSION-MOLDED ARTICLE

BACKGROUND OF THE INVENTION

1. Field of the Invention

The present invention relates to methods and apparatus for producing expansion-molded articles.

2. Description of the Background Art

As a process for molding foamed particles of a polyolefin resin, there has heretofore been used only a process in which the foamed particles are filled into a mold and heated with steam to secondarily expand the foamed particles, thereby mutually fusion-bonding them (such a molding process will hereinafter be referred to as "batch type molding process"). On the other hand, in the case of foamed particles of a polystyrene resin, there is also used a process in which the foamed particles are caused to pass through a heating region by holding them between belts provided on upper and lower sides to convey them, thereby continuously molding them (such a process will hereinafter be referred to as "continuous molding process"). The process described in Japanese Patent Publication No. 2424/1977, in which a steam heating method is used, the process described in Japanese Patent Publication No. 1632/1966, in which a high-frequency heating method is used, the process described in Japanese Patent Publication No. 42621/1972, in which a hot-air heating method is used, and the like have been known. The continuous molding process has the advantages of permitting the continuous production of molded articles from foamed particles and the provision of molded articles of continuous length compared with the batch type molding process.

However, such a high-frequency heating method as described in Japanese Patent Publication No. 1632/1966 involves a problem that it requires a large and expensive apparatus and a possibility that sparks may be emitted upon high-frequency heating, and is unsuitable for use as a heating means for foamed particles of a polyolefin resin, which must be heated with a heating temperature range controlled narrow. Such a hot-air heating method as described in Japanese Patent Publication No. 42621/1972 is also hard to control the heating temperature, is difficult to evenly heat the foamed particles because the heat capacity of hot air is smaller than steam, and is hence also unsuitable for use as a heating means for continuously molding the foamed particles of the polyolefin resin.

On the other hand, the steam heating method is a method useful even for the foamed particles of the polyolefin resin. However, an attempt to mold the foamed particles of the polyolefin resin by the continuous molding process using such steam heating as described in Japanese Patent Publication No. 2424/1977 has involved such problems that steam for heating the foamed particles leaks out on the feeding side of the foamed particles to cause failures in fusion bonding among the foamed particles and in secondary expansion of the foamed particles due to insufficient heating, and that when the leakage of the steam becomes greater, the foamed particles fed come to flow backward on the feeding side. The reason for this is considered to be attributable to a difference in secondary expandability between the foamed particles of the polystyrene resin and the foamed particles of the polyolefin resin. More specifically, the foamed particles of the polystyrene resin undergo secondary expansion at a relatively low temperature (generally, 100° C. or lower) because the polystyrene resin is noncrystalline and has good retention of a foaming agent used in the preparation of the foamed particles, and so the foamed particles contain about several percent of the foaming agent. Therefore, when the foamed particles of the polystyrene resin are continuously molded, the fact that the foamed particles gently undergo secondary expansion before they reach a heating region, and so interparticle spaces are closed, and the fact that the foamed particles of the polystyrene resin can be molded with steam of pressure as relatively low as about 1.0 kg/cm$^2$G can between them easily prevent the steam from leaking out on the feeding side of the foamed particles. It is consequently considered that reliable molding becomes feasible.

On the other hand, the polyolefin resin is crystalline, and a foaming agent used in the preparation of the foamed particles thereof escapes out of the particles in a relatively short period of time. Therefore, in order to secondarily expand the foamed particles of the polyolefin resin, it is necessary to heat the foamed particles at a temperature higher than the case of the foamed particles of the polystyrene resin. It is thus not easy to secondarily expand the foamed particles of the polyolefin resin to such an extent that the leakage of the steam can be prevented before they reach the heating region. In addition, the secondary expansion of the foamed particles of the polyolefin resin requires to feed high-pressure steam. It is therefore considered that even if the foamed particles of the polyolefin resin could be secondarily expanded to some extent, it was difficult to prevent the leakage of the high-pressure steam by only the secondary expandability of the foamed particles. As described above, the leakage of the heating steam tends to more often occur in the case of the foamed particles of the polyolefin resin, which require steam of pressure higher than the case of the foamed particles of the polystyrene resin in order to provide a satisfactory molded article by secondarily expanding the foamed particles to mutually fusion-bond them. Consequently, such a process has involved a problem that not only the pressure of the heating steam is lowered, thereby failing to sufficiently heat the foamed particles and provide any molded article, but also the foamed particles come to flow backward on the feeding side of the foamed particles when the leakage of the steam becomes greater, resulting in an impossibility of molding.

With the foregoing problems in view, the present applicant proposed, as processes for continuously molding foamed particles of a polyolefin resin, (1) a process in which foamed particles are compressed to a bulk volume of 40–70% on the original bulk volume in a foamed particle-feeding region and then heated with steam (Japanese Patent Application No. 289360/1995), and (2) a process in which foamed particles the internal pressure of which has been raised are gradually compressed in a foamed particle-feeding region and then heated with steam (Japanese Patent Application No. 289361/1995). However, these processes have also still involved the following problems.

Namely, the process (1) has involved a problem that since the foamed particles are heated in the state that they have been compressed to a bulk volume of 40–70% on the original bulk volume, the resulting molded article comes to have an expansion ratio greatly lowered compared with the expansion ratio of the original foamed particles.

On the other hand, according to the process (2), the degree of reduction in expansion ratio of the resulting molded article is smaller than that of the process (1) because the foamed particles the internal pressure of which has been raised is used, and so it is possible to control the reduction in expansion ratio of the molded article compared with the expansion ratio of the original foamed particles to substantially the same degree as that of the molded article obtained by the batch type molding process. However, the process (2)

requires to apply an internal pressure considerably higher than the batch type molding process to foamed particles. When the foamed particles to which such a high internal pressure has been applied are used, it takes a longer time to cool the resulting molded article. In the continuous molding process, it therefore involves a problem that a line speed in molding must be slowed down, and so productivity is lowered. Further, in order to apply a high internal pressure to the foamed particles, it is necessary to subject the foamed particles to a pressurizing treatment for a long period of time in a high-pressure tank. This also has formed the factor of reduction in productivity.

SUMMARY OF THE INVENTION

The present invention has been completed in view of the foregoing circumstances, and has as its object the provision of methods and apparatus for producing expansion-molded articles, by which in continuous molding of foamed particles of a polyolefin resin, the degree of reduction in expansion ratio of the resulting molded article compared with the expansion ratio of the original foamed particles can be made small without applying a high internal pressure to the foamed particles, and at the same time the time required to cool the molded article can be shortened, so that the line speed in the molding can be increased to improve productivity.

According to the present invention, there is thus provided a method for continuously producing an expansion-molded article, which comprises feeding foamed particles between a belt continuously traveling along the upper surface and having a passageway defined by structural members and having a rectangular form in section and a belt continuously traveling along the lower surface within the passageway, and then causing the foamed particles to successively pass through a super heated steam-feeding region and a cooling region within the passageway, characterized in that the foamed particles used are foamed particles of a polyolefin resin, in which a recovery factor from compression defined by the following equation (1):

$$\text{Recovery factor from compression } (\%) = V_2/V_1 \times 100 \quad (1)$$

wherein $V_1$ is the original bulk volume of the foamed particles, and $V_2$ is a bulk volume of the foamed particles measured upon elapsed time of 10 seconds after the foamed particles are compressed to a bulk volume of 60% based on the original bulk volume, and the compressive force is then removed, is at least 80%, and said foamed particles are transferred to the super heated steam-feeding region after the foamed particles are compressed on the upstream side of the super heated steam-feeding region, and then released from a part or the whole of the compression.

According to the present invention, there is also provided an apparatus for continuously producing an expansion-molded article by feeding foamed particles between a belt continuously traveling along the upper surface within a passageway defined by structural members and having a rectangular form in section and a belt continuously traveling along the lower surface within the passageway, and then causing the foamed particles to successively pass through a super heated steam-feeding region and a cooling region within the passageway, characterized in that a compressing means for compressing the foamed particles and a compression-releasing means for removing a part or the whole of the compression are provided within the passageway on the upstream side of the super heated steam-feeding region.

The above and other objects, features and advantages of the present invention will be readily appreciated as the same becomes better understood from the preferred embodiments of the present invention, which will be described subsequently in detail with reference to the accompanying drawings, and from the appended claims.

DETAILED DESCRIPTION OF THE PREFERRED EMBODIMENTS

Figure 1:
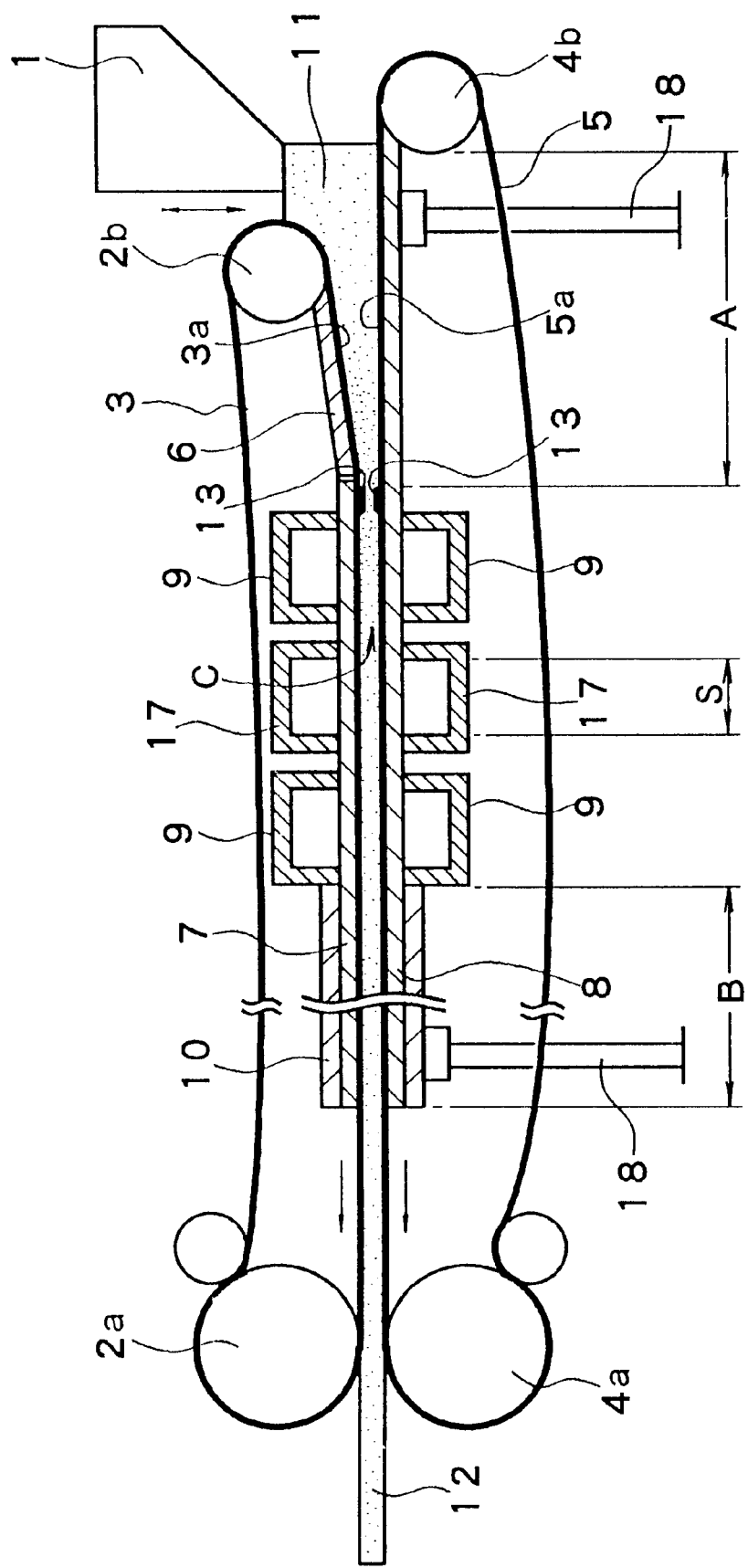
FIG. 1 is a schematic drawing of a molding apparatus illustrating an embodiment of a method according to the present invention.

The resin which forms the foamed particles useful in the practice of the present invention is a polyolefin resin, which is composed of a homopolymer of an α-olefin component such as ethylene, propylene or 1-butene, a copolymer containing at least 50 wt. % of such an α-olefin component or a mixture of at least two of these homopolymers and copolymers, or a mixture composed of such a polyolefin resin and any other resin than the polyolefin resin and/or a synthetic rubber and comprising at least 50 wt. % of the α-olefin component. The resins are used as uncrosslinked or in a crosslinked state.

The foamed particles of the polyolefin resin used in the present invention are preferably those having a bulk density of 0.09–0.006 g/cm$^3$ or those formed of an uncrosslinked polypropylene resin or uncrosslinked polyethylene resin as a base resin and having two endothermic peaks on a DSC curve obtained by their differential scanning calorimetry (see Japanese Patent Publication Nos. 44779/1988 and 39501/1995). The DSC curve means a DSC curve obtained when 0.5–4 mg of a foamed particle sample is heated from room temperature to 220° C. at a heating rate of 10° C./min by means of a differential scanning calorimeter to measure it. The foamed particles formed of an uncrosslinked polypropylene resin or uncrosslinked polyethylene resin as a base resin and having two endothermic peaks on the DSC curve thereof have an effect of providing a molded article having excellent surface smoothness, dimensional stability and mechanical strength compared with those not having two endothermic peaks on the DSC curve thereof.

Incidentally, the polypropylene resin means a resin, which is composed of a propylene homopolymer, a copolymer containing at least 50 wt. % of a propylene component or a mixture of at least two of these homopolymers and copolymers, or a mixture composed of such a polypropylene resin and any other resin than the polypropylene resin and/or a synthetic rubber and comprising at least 50 wt. % of the propylene component. The polyethylene resin means a resin, which is composed of an ethylene homopolymer, a copolymer containing at least 50 wt. % of an ethylene component or a mixture of at least two of these homopolymers and copolymers, or a mixture composed of such a polyethylene resin and any other resin than the polyethylene resin and/or a synthetic rubber and comprising at least 50 wt. % of the ethylene component.

In the present invention, it is necessary to use, as the foamed particle of the polyolefin resin, those in which a recovery factor from compression represented by the following equation (1):

$$\text{Recovery factor from compression (\%)} = V_2/V_1 \times 100 \qquad (1)$$

wherein $V_1$ is the original bulk volume of the foamed particles, and $V_2$ is a bulk volume of the foamed particles measured upon elapsed time of 10 seconds after the foamed particles are compressed to a bulk volume of 60% based on the original bulk volume, and the compressive force is then removed, is at least 80%, preferably at least 85%.

The foamed particles of the polyolefin resin used in the present invention can be prepared by, for example, a process in which particles of a polyolefin resin and a foaming agent are dispersed in water in a closed vessel, the resultant dispersion is heated to a temperature not lower than the softening point of the resin particles to impregnate the resin particles with the foaming agent, and the resin particles and water are then released into an atmosphere of a pressure lower than the internal pressure of the vessel, thereby expanding the resin particles. In order to impart such a high recovery factor from compression of at least 80% as described above to the foamed particles of the polyolefin resin, it is most important to enhance the closed cell content in the foamed particles. The foamed particles having a high closed cell content can be easily obtained by, for example, expanding resin particles so as to form foamed particles having two endothermic peaks on a DSC curve thereof as described above. However, they may also be obtained by other methods. In the present invention, it is however preferable to use the foamed particles having a high closed cell content formed so as to have two endothermic peaks on a DSC curve thereof. The bulk density of the foamed particles and the kind of the base resin of the foamed particles are important second to the closed cell content as factors for imparting a high recovery factor from compression to the foamed particles. In order to impart the high recovery factor from compression, it is preferable to control the bulk density of the foamed particles to 0.09–0.006 g/cm$^3$ and to select a polypropylene resin or polyethylene resin as the base resin. Incidentally, the kind of a foaming agent used and a foaming temperature may be mentioned as other factors which may slightly affect the recovery factor from compression of the foamed particles.

The foamed particles of the polyolefin resin, which are used as a raw material in the method of the present invention, may be those to which an internal pressure higher than the atmospheric pressure has been applied by subjecting them to a pressurizing treatment with air or the like. However, foamed particles of a polyolefin resin, which have an internal pressure substantially equal to the atmospheric pressure, may also be used in the method of the present invention. In the case where the foamed particles the internal pressure of which has been increased are used, it is preferable to use those having an internal pressure of 2.5 atm or lower. On the other hand, when the foamed particles having an internal pressure substantially equal to the atmospheric pressure are used, the step of the pressurizing treatment for applying the internal pressure to the particles and the equipment therefor become useless. As a result, it is possible to reduce production cost to a great extent. No particular limitation is imposed on the weight of each of the foamed particles used. However, those having an average particle weight of about 0.5–5 mg are generally used.

FIG. 1 illustrates an exemplary molding apparatus used for practicing the method for continuously molding the foamed particles of the polyolefin resin according to the present invention. In FIG. 1, reference characters A, B, C and S designate a foamed particle-feeding region, a molded article-cooling region, a passageway through which the foamed particles and molded article are transferred, and a super heated steam-feeding region, respectively. The molding apparatus includes a hopper 1 in which the foamed particles are stored, an endless belt 3 traveling between upper rolls 2a and 2b, and an endless belt 5 traveling between lower rolls 4a and 4b, and is so constructed that the foamed particles 11 of the polyolefin resin fed to the feeding region A from the hopper 1 are held between the endlessly traveling upper and lower belts 3 and 5 to cause them to pass through the passageway C, during which they are heated with steam to mutually fusion-bond the foamed particles, thereby obtaining a molded article. Incidentally, reference numeral 18 in FIG. 1 indicates a support.

In the molding apparatus according to the present invention, the upper roll 2a and the lower roll 4a are driven to rotate on their axes, while the upper roll 2b and the lower roll 4b do not rotate. Therefore, the upper belt 3 and the lower belt 5 are constructed so as to travel slidably on the rolls 2b and 4b, respectively. A lubricant such as polytetrafluoroethylene (Teflon) is provided on the rolls 2b and 4b at their surfaces with which the respective belts come into contact, so as to enhance the slidability of the belts. The upper roll 2b is so constructed that it can be vertically moved by a moving means (not illustrated) and that the inclination angle of the upper belt 3 in the foamed particle-feeding region A can be varied by shifting the position of the upper roll 2b. Reference numeral 6 indicates an auxiliary press plate and is so constructed that when the inclination angle of the upper belt 3 is adjusted by vertically moving the upper roll 2b, the inclination angle of the auxiliary press plate 6 can be varied together with the belt 3. When the upper belt 3 is inclined in the foamed particle-feeding region A in such a manner that a space between the upper belt 3 and the lower belt 5 becomes gradually narrow toward the downstream side (a direction of flow in the molding process), the foamed particles 11 of the polyolefin resin fed from the hopper 1 can be compressed while they are being transferred on the downstream side.

The compressed foamed particles are fed to the passageway C having a space of a substantially rectangular form in section defined by upper and lower thickness-regulating plates 7 and 8 and width-regulating plates (not expressly illustrated) provided over between their corresponding sides of the thickness-regulating plates 7 and 8. The upper and lower belts 3 and 5 are so constructed that they travel with the lower part 3a of the upper belt 3 and the upper part 5a of the lower belt 5 coming into contact with the thickness-regulating plates 7 and 8, respectively, in passageway C. The thickness-regulating plates 7 and 8 and the auxiliary press plate 6 are composed of a metal plate such as an aluminum plate, and a lubricant composed of polytetrafluoroethylene or the like is fixed to their surfaces, with which the respective belts 3 and 5 come into contact, so as to improve the slidability of the belts 3 and 5. Incidentally, the present invention is not limited to the case where the endlessly traveling belts may be provided only on the upper and lower sides, and so they may also be provided on both lateral sides. When no endlessly traveling belt is provided on both lateral sides, for example, the resulting molded article is transferred sliding on the surfaces of the width-regulating plates and the like within the passageway C. When the endlessly traveling belts are also provided on both lateral sides, however, there is no possibility that the molded article may come into contact with the surfaces of the width-regulating plates and the like, so that the form and appearance of sides of the resulting molded article can be improved.

Figure 2:
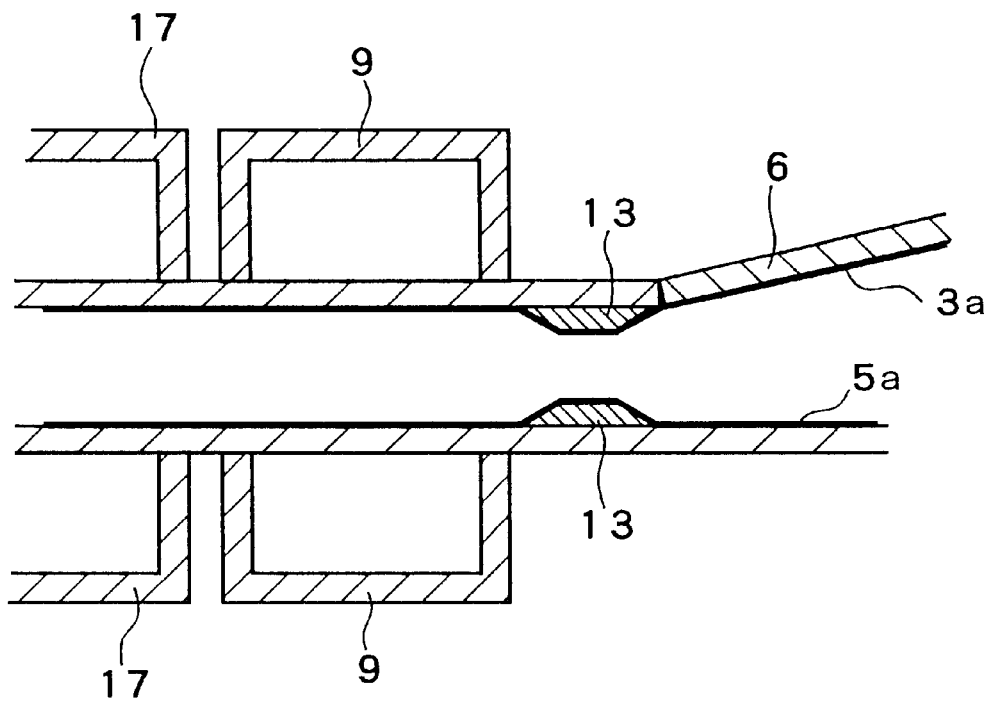
FIG. 2 is a cross-sectional view of principal parts illustrating an embodiment of a method for conducting compression of foamed particles and release from the compression.

As illustrated in FIG. 2, a projection 13 is provided on each of upper and lower sides near the entrance to the passageway C. The foamed particles are compressed to the utmost at the time they have reached the top of the projection. At this time, the foamed particles are preferably compressed to a bulk volume of 10–60% (the proportion of this compression will hereinafter be referred to as "compression ratio") based on the bulk volume of the original foamed particles (uncompressed foamed particles). It is particularly preferable to compress them to a compression ratio of 15–50%. The compression ratio of the foamed particles can be controlled by changing the height of the projection 13 or/and changing the inclination angle of the upper belt 3. If the foamed particles are compressed to a compression ratio lower than 10% (excess of compression), there is a possibility that the cells in the foamed particles may be broken, resulting in impossibility of molding, or that a load applied to the apparatus by the compression may be increased. If the foamed particles are compressed to a compression ratio higher than 60% (insufficiency of compression), there is a possibility that seal of steam may become insufficient, so that heating steam leaks out on the feeding side of the foamed particles to cause insufficient heating of the particles, resulting in a failure to provide a satisfactory molded article, or that the foamed particles fed may be caused to flow backward on the feeding side by the steam leaked, resulting in impossibility of molding. When a high internal pressure is applied to the foamed particles, the high secondary expandability thereof can prevent the heating steam from flowing backward on the feeding side of the foamed particles. However, it takes a longer time to cool the resulting molded article, so that the line speed must be slowed down, resulting in lowered productivity. Incidentally, the projection 13 may be provided on either of the upper and lower sides or on both upper and lower sides. In order to enhance the slidability between the projection 13 and the belt 3 or 5, a lubricant composed of polytetrafluoroethylene or the like is provided on the projection 13 at its surface with which the belt 3 or 5 comes into contact, or the whole of the projection 13 is formed with polytetrafluoroethylene or the like.

When the foamed particles are compressed while transferring them by holding them between the inclined upper belt 3 and the lower belt 5 in the foamed particle-feeding region A, the inclination angle of the upper belt 3 is preferably adjusted to 10° or narrower, more preferably 1–5°. If the foamed particles are compressed to such a quick extent that the inclination angle of the upper belt 3 is wider than 10°, the particles tend to be returned in a direction of the hopper due to the rebounding force of the particles compressed. As a result, the desired compression ratio cannot be achieved. In order to smoothly compress the foamed particles, it is preferable for the above-described reason to control the inclination angle of the upper belt 3 narrower. However, the narrower the inclination angle, the longer the length of the apparatus. It is therefore desirable that the inclination angle be suitably selected within the range in which the particles are not returned to the hopper.

The foamed particles transferred by holding them between the belts 3 and 5 are compressed to the utmost at the time they have reached the top of the projection 13. After passing through the top of the projection 13, the foamed particles are released from a part or the whole of the compression. The release of the foamed particles from the compression is preferably conduced in such a manner that a release factor from compression defined by the following equation (2):

$$\text{Release factor from compression (\%)} = b/a \times 100 \qquad (2)$$

wherein a is a sectional area of a space at the place where the foamed particle are most compressed on the upstream side of the super heated steam-feeding region, and b is a sectional area of an exit of the molded article from the cooling region, is at least 150%.

The foamed particle from which a part or the whole of the compression has been released are heated with steam jetted out within the passageway C from steam-feeding sections 17 in the super heated steam-feeding region S as they are held between the belts 3 and 5. Therefore, the belts 3 and 5 must have good permeability to steam. As such a belt, there is generally used a belt obtained by boring a great number of through-holes each having a diameter of 0.5–3.0 mm at a pitch of about 10–50 mm in a stainless steel belt having a thickness of about 0.2–1.0 mm. The super heated steam-feeding region S includes the steam-feeding sections 17 for heating the foamed particles 11 with steam to mold them and sucking sections 9 for sucking the heating steam and drain of the steam under reduced pressure on both upstream and downstream sides of the super heated steam-feeding region S. The provision of the sucking sections 9 to conduct suction permits preventing the drain from standing in the passageway to inhibit the feed of the foamed particles (particularly, the action of the sucking sections 9 on the upstream side of the super heated steam-feeding region S), and preventing the cooling effect on the molded article from being lowered due to the drain to cause warpage on the resulting molded article (particularly, the action of the sucking sections 9 on the downstream side of the super heated steam-feeding region S). The present invention is not limited only to the case where the sucking sections 9 are provided at both upper and lower parts of the passageway, and so they may be provided only at lower parts of the passageway for the purpose of removing drain standing on the lower side of the passageway.

The apparatus according to the present invention is so constructed that the heating steam fed from the steam-feeding sections 17 is fed within the passageway C through the through-holes bored in the thickness-regulating plates 7 and 8 and the through-holes bored in the belts 3 and 5. The pressure of the heating steam fed from the steam-feeding sections 17 is generally 1.0–4.0 kg/cm²G.

The foamed particles heated with the steam expand so as to close interparticle spaces within the passageway C, and undergo mutual fusion bonding to form a molded article (although it cannot be said to be a complete molded article at this time, it is called a molded article for the sake of convenience because the foamed particles have been mutually fusion-bonded). The molded article is then transferred to the cooling region B equipped with a cooling means 10 to cool it. As the cooling means, for example, a cooling plate, in which a cooling water circulating pipe is built, is used. The above-described steps are continuously and repeatedly conducted to obtain a molded article 12 of continuous length. Incidentally, the sucking sections 9, steam-feeding sections 17 and cooling means 10 are may be provided not only on the sides of the thickness-regulating plates 7 and 8, but also on the sides of the width-regulating plates though not expressly illustrated.

In the present invention, it is preferable that the area of a section of the passageway C perpendicular to the direction, in which the foamed particles are transferred, be kept substantially constant on the downstream side from the starting point of the super heated steam-feeding region S until the molded article is fully cooled. If the molded article is compressed on the downstream side from the starting point of the super heated steam-feeding region S (the sectional area of the space within the passageway on the downstream side from the super heated steam-feeding region S is made narrower) before the molded article is fully cooled, a mark such as a flow mark is left on the surface of the resulting molded article 12, so that the surface appearance of the molded article 12 is deteriorated. On the other hand, if the sectional area of the space within the passageway on the downstream side from the super heated steam-feeding region S is made wider, there is a possibility that the cooling may not be fully performed. Incidentally, the term "the molded article is fully cooled" means that the molded article is cooled to such a low temperature that it undergoes no substantial expansion.

In the above embodiment, the apparatus is so constructed that the projection 13 is provided on each of the upper and lower sides near the entrance to the passageway C, and the foamed particles transferred by holding them between the belts 3 and 5 are compressed to the utmost at the time they have reached the top of the projection 13, and released from a part or the whole of the compression by transferring them on the downstream side from the top of the projection 13. However, the projection 13 may be provided at an optional position between the vicinity of the entrance to the passageway C and the starting point of the super heated steam-feeding region S. The projection 13 may not be necessarily provided at two positions of the upper and lower sides, but may be provided at only one position of the upper or lower side. The form of the projection 13 is not limited to such a trapezoid as illustrated, and so the projection 13 may be in any form.

Figure 3:
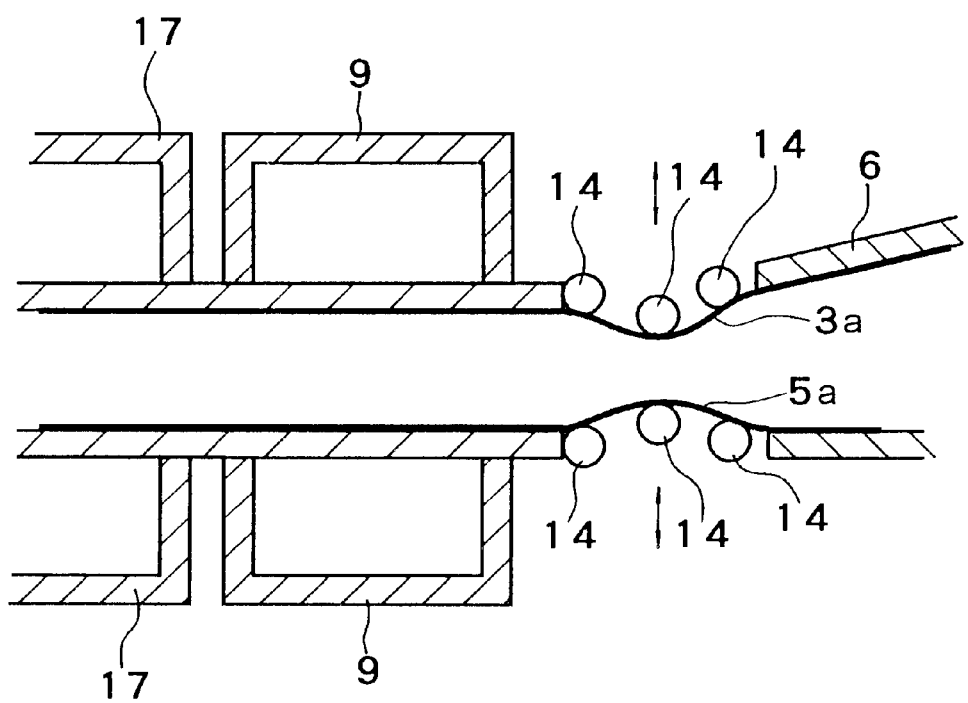
FIG. 3 is a cross-sectional view of principal parts illustrating another embodiment of a method for conducting compression of foamed particles and release from the compression.
Figure 4:
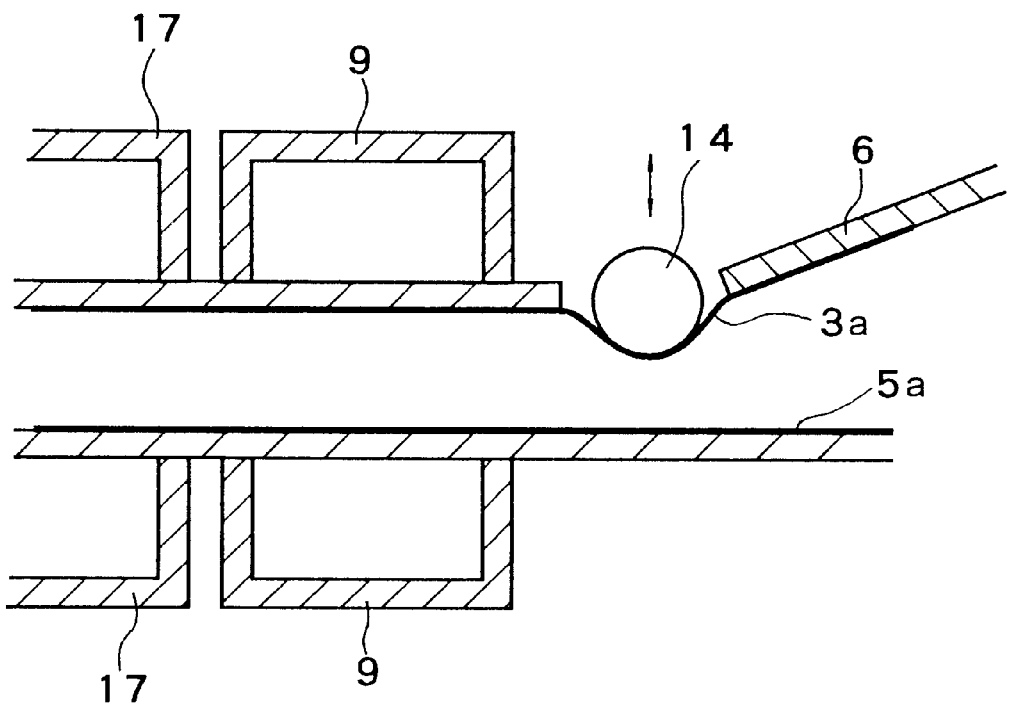
FIG. 4 is a cross-sectional view of principal parts illustrating a further embodiment of a method for conducting compression of foamed particles and release from the compression.

In the above embodiment, the apparatus is so constructed that the foamed particles are compressed to the utmost at the time they have reached the top of the projection 13, and released from the compression after passing through the top of the projection 13. However, it may also be so constructed that each of the belts 3 and 5 can be pressed by a plurality of vertically movable press rolls 14 as illustrated in FIG. 3, so as to conduct the utmost compression of the foamed particles and their release from the compression by the press rolls 14. Further, the apparatus may be so constructed that only the upper belt 3 is pressed by a press roll 14 as illustrated in FIG. 4. When the belts 3 and 5 (or only the belt 3) are pressed by the press rolls or roll 14 as illustrated in FIG. 3 or 4, it is necessary to provide a rubber sheet or the like at a position where the roll is provided, so as to form a sealing structure to prevent the steam from leaking out through the belt in the vicinity of the press roll 14 because a great number of steam-permeable holes are bored in the belts 3 and 5 as described above.

Figure 5:
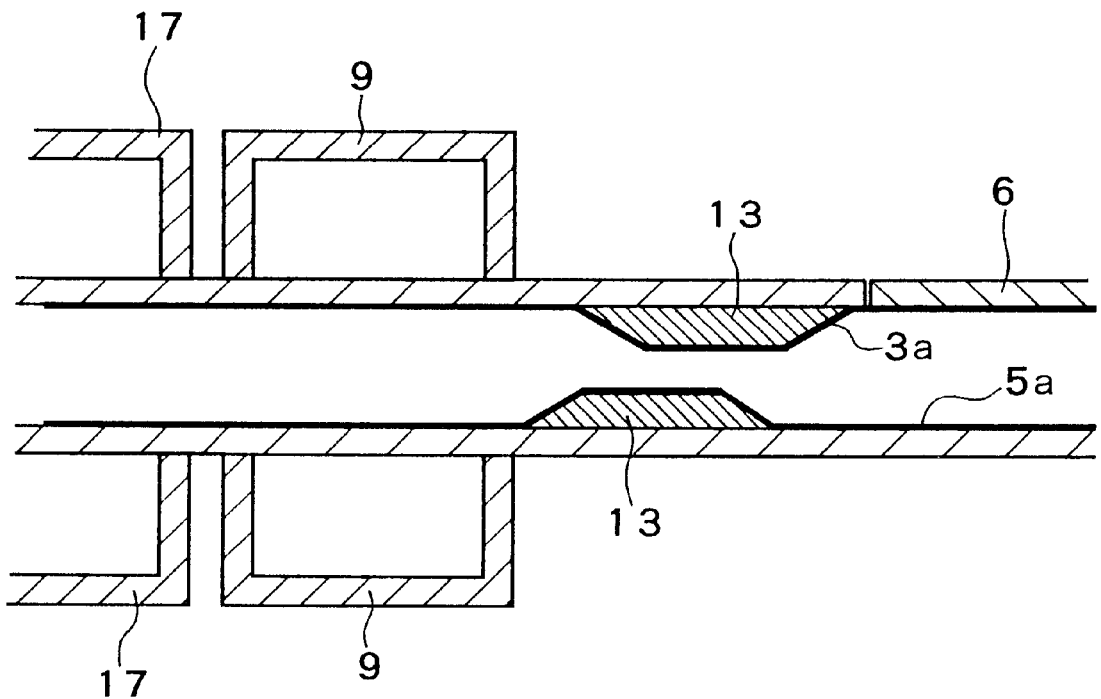
FIG. 5 is a cross-sectional view of principal parts illustrating a still further embodiment of a method for conducting compression of foamed particles and release from the compression.
Figure 6:
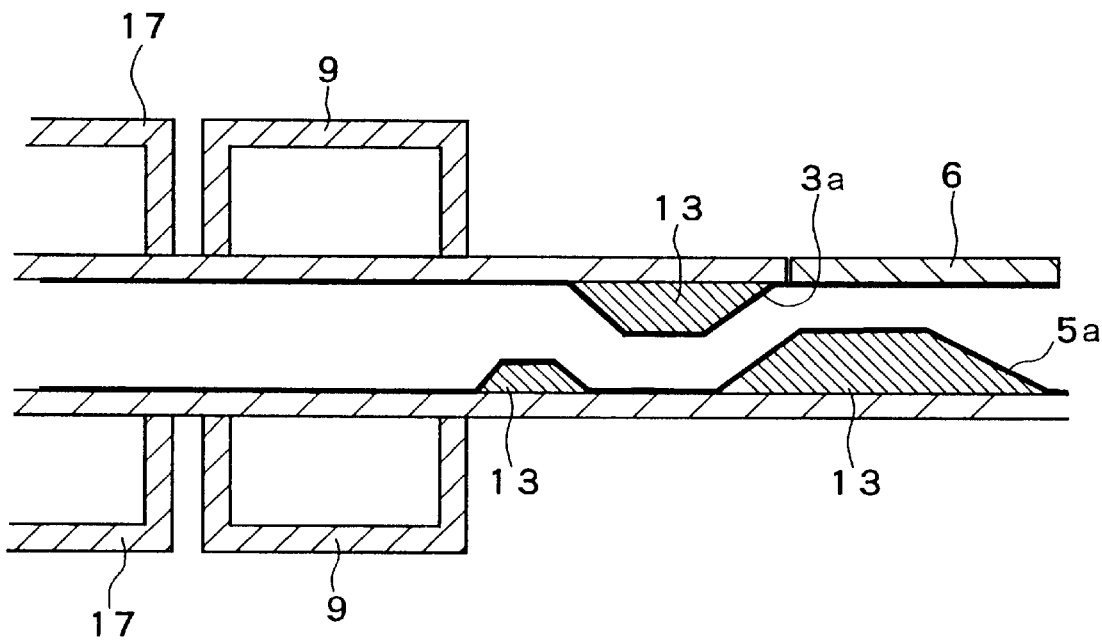
FIG. 6 is a cross-sectional view of principal parts illustrating a yet still further embodiment of a method for conducting compression of foamed particles and release from the compression.

In order to conduct the compression of the foamed particles and their release from the compression, furthermore, a projection 13 may also be provided on each of the upper and lower sides near the entrance to the passageway C with the positions of the projections staggered as illustrated in FIG. 5. When the projections 13 are provided with their positions staggered as described above, the foamed particles can be not only smoothly compressed to the utmost at the time they have reached the top of the projection 13, but also smoothly released from the compression. Further, when a plurality of projections 13 are alternately provided on the upper and lower sides in such a manner that the height of the projection becomes lower toward the direction of the passageway C from the direction of the foamed particle-feeding region A as illustrated in FIG. 6, the foamed particles compressed can be more smoothly released from the compression. When a plurality of projections 13 are alternately provided on the upper and lower sides in such a manner that the height of the projection becomes higher toward the direction of the passageway C from the direction of the foamed particle-feeding region A though not expressly illustrated, the foamed particles can be more smoothly compressed. When a plurality of projections 13 are alternately provided on the upper and lower sides in such a manner that the height of the projection becomes higher toward the direction of the passageway C from the direction of the foamed particle-feeding region A, and a plurality of projections 13 are then alternately provided on the upper and lower sides in such a manner that the height of the projection becomes lower toward the direction of the passageway C from the direction of the foamed particle-feeding region A, both compression of the foamed particles and their release from the compression can be more smoothly conducted.

Figure 7:
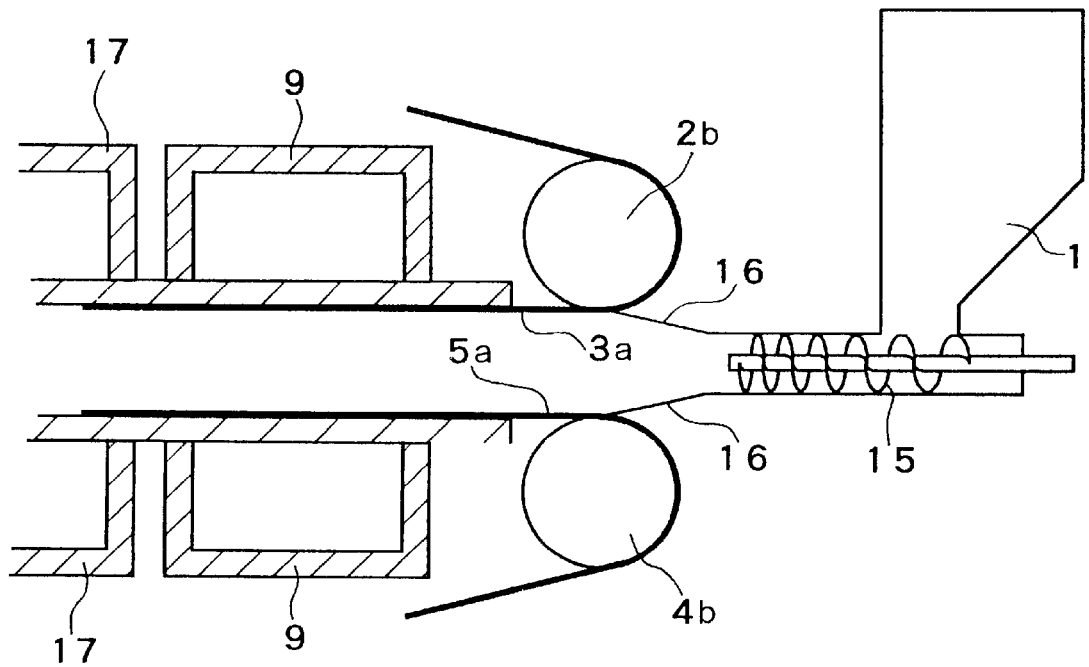
FIG. 7 is a cross-sectional view of principal parts illustrating a yet still further embodiment of a method for conducting compression of foamed particles and release from the compression.

FIG. 7 illustrates another embodiment for conducting the compression of the foamed particles. In this embodiment, the foamed particles 11 are compressed by a screw feeder 15 so constructed that its screw pitch becomes narrower toward the tip. In this case, the release from the compression of the foamed particles compressed by the screw feeder 15 can be conducted by, for example, providing inclined plates 16 in such a manner that the space becomes wider toward the direction of the passageway C.

In the present invention, not only the method in which the foamed particles are compressed by both inclined belt and projection as described above, but also, though not expressly illustrated, a method in which the foamed particles are compressed only by holding them between inclined belts to transfer them, and then released from the compression by providing inclined plates in such a manner that the space becomes wider toward the direction of the passageway C, may be used.

The present invention will hereinafter be described in more detail by the following examples. However, the present invention is not limited to these examples.

EXAMPLE 1

Foamed particles shown in Table 1 were compressed in the same apparatus (dimensions of passageway C were fixed as follows: width between the position just after passed through the projections and the exit of the molded article from the cooling region B: 300 mm; height therebetween: 25 mm) as that illustrated in FIG. 1 so as to give a compression ratio shown in Table 1, and then released from the compression so as to give a release factor from compression shown in Table 1 (using projections of the type illustrated in FIG. 2). The thus-treated foamed particles were heated with heating steam while transferring them through the super heated steam-feeding region S by holding them between the belts 3 and 5. The line speed and steam pressure in the molding are shown collectively in Table 1. In this example, suction under reduced pressure was performed in the sucking sections 9 situated at the upstream and downstream sides of the super heated steam-feeding region.

TABLE 1

| | | Example 1 | Comp. Example 1 |
|---|---|---|---|
| Kind of base resin*4 | | Uncrosslinked ethylene-propylene random copolymer | |
| Foamed particles before compression | Bulk density (g/cm³) | 0.013 | 0.013 |
| | Internal air pressure of particles (atm) | 2.0 | 2.7 |
| | Recovery factor from compression (%)*1 | 94 | 96 |
| | Average weight of particles (mg/particle) | 1.8 | 1.8 |
| | Presence of two peaks on DSC curve | Present | Present |
| Compression ratio of foamed particles (%) | | 60 | 95 |
| Release factor of foamed particles from compression (%) | | 160 | 100 |
| Molding conditions | Steam pressure (kg/cm²G) | 2.6 | 3.0 |
| | Line speed (m/min) | 2.0 | 1.0 |
| Operating state of molding apparatus | | Good without any leakage of steam | Stably operated though leakage of steam occurred |
| Properties of molded article | Fusion bonding property of foamed particles*2 | ○ | ○ |
| | Density (g/cm³) | 0.015 | 0.015 |
| | Density ratio*3 | 0.87 | 0.87 |
| | Appearance | Good | Good |

(Note)
*1: The recovery factor of sample foamed particles from compression was determined by placing the foamed particles in a cylindrical container having a diameter of 100 mm to a height of 200 mm, compressing them to a height of 120 mm at a rate of 20 mm/min by a compressing plate, raising the compressing plate at a rate of 20 mm/min to remove the compressive force applied to the foamed particles, stirring the foamed particles, and then measuring the height of the foamed particles after 10 seconds from the removal of the compressive force, thereby calculating the recovery factor from a bulk volume found from the height of the foamed particles before the compression and a bulk volume found from the height of the foamed particle after the removal of the compression in accordance with the equation (1).
*2: The fusion bonding property of sample foamed particles was evaluated by cutting a specimen having a thickness of 10 mm, a width of 50 mm and a length of 100 mm out of the resulting molded article, and pulling this specimen in its longitudinal direction to break it, thereby determining a proportion of foamed particles broken at the broken-out section, and ranked in accordance with the following standard:
○: At the broken-out section, breakage of foamed particles (non-interparticle breakage) occurred in a proportion of at least 50%; and
X: At the broken-out section, breakage of foamed particles and interparticle breakage occurred in proportions of lower than 50% and at least 50%, respectively.
*3: The density ratio was defined as (bulk density of foamed particles before compression)/(density of molded article).
*4: A resin having a melting point of 138° C., an ethylene content of 5.3 wt. % and a melt flow rate (according to JIS K 6747-1981, paragraph 4.3) of 8 g/10 min.

COMPARATIVE EXAMPLE 1

Molding was conducted by using an apparatus having no compression-releasing means (i.e. an apparatus having no projection) and foamed particles having the same bulk density as in Example 1 and selecting molding conditions in such a manner that a molded article having the same density as that obtained in Example 1 can be provided. The properties of the foamed particles used, molding conditions and the properties of the molded article obtained are shown collectively in Table 1.

As apparent from the results shown in Table 1, in the case of Comparative Example 1, in which the molding was conducted without releasing the foamed particles from the compression, it was necessary to increase the internal air pressure of the foamed particles in order to provide a molded article having the same density as the molded article obtained in Example 1 and good properties, so that it took a longer time to apply the internal pressure. As the result of the application of the higher internal pressure, it was necessary to slow down the line speed in the molding to about a half as slow as that in Example 1 and increase the pressure of the heating steam, so that productivity such as production efficiency and production cost was markedly deteriorated.

EXAMPLE 2

Foamed particles shown in Table 2 were compressed in the same apparatus (dimensions of passageway C were fixed as follows: width between the position just after passed through the projections and the exit of the molded article from the cooling region B: 300 mm; height therebetween: 25 mm) as that illustrated in FIG. 1 so as to give a compression ratio shown in Table 2, and then released from the compression so as to give a release factor from compression shown in Table 2 (using projections of the type illustrated in FIG. 2). The thus-treated foamed particles were heated with heating steam while transferring them through the super heated steam-feeding region S by holding them between the belts 3 and 5. The line speed and steam pressure in the molding are shown collectively in Table 2. In this example, suction under reduced pressure was performed in the sucking sections 9 situated at the upstream and downstream sides of the super heated steam-feeding region.

TABLE 2

| | | Example 2 | Comp. Example 2 |
|---|---|---|---|
| Kind of base resin*4 | | Uncrosslinked ethylene-propylene random copolymer | |
| Foamed particles before compression | Bulk density (g/cm³) | 0.027 | 0.027 |
| | Internal air pressure of particles (atm) | 1.8 | 1.8 |
| | Recovery factor from compression (%)*1 | 94 | 94 |
| | Average weight of particles (mg/particle) | 1.8 | 1.8 |
| | Presence of two peaks on DSC curve | Present | Present |
| Compression ratio of foamed particles (%) | | 36 | 70 |
| Release factor of foamed particles from compression (%) | | 250 | 100 |
| Molding conditions | Steam pressure (kg/cm²G) | 2.6 | 3.0 |
| | Line speed (m/min) | 2.0 | 2.0 |
| Operating state of molding apparatus | | Good without any leakage of steam | Stably operated though great leakage of steam occurred |

TABLE 2-continued

|  |  | Example 2 | Comp. Example 2 |
|---|---|---|---|
| Properties of molded article | Fusion bonding property of foamed particles*2 | ○ | ○ |
|  | Density (g/cm³) | 0.033 | 0.043 |
|  | Density ratio*3 | 0.82 | 0.63 |
|  | Appearance | Good | Good |

COMPARATIVE EXAMPLE 2

Molding was conducted by using an apparatus having no compression-releasing means (i.e. an apparatus having no projection) and foamed particles having the same bulk density and internal pressure as in Example 2 and selecting other molding conditions in such a manner that a molded article of good quality can be provided when the molding is conducted at the same line speed as in Example 2. The properties of the foamed particles used, molding conditions and the properties of the molded article obtained are shown collectively in Table 2.

As apparent from the results shown in Table 2, even when the foamed particles having the same bulk density were used, only a molded article having a high density compared with the method of Example 2 could be obtained when an attempt to provide a molded article of excellent quality was made according to the method of Comparative Example 2.

EXAMPLE 3

Foamed particles shown in Table 3 were compressed in the same apparatus (dimensions of passageway C were fixed as follows: width between the position just after passed through the projections and the exit of the molded article from the cooling region B: 300 mm; height therebetween: 25 mm) as that illustrated in FIG. 1 so as to give a compression ratio shown in Table 3, and then released from the compression so as to give a release factor from compression shown in Table 3 (using projections of the type illustrated in FIG. 2). The thus-treated foamed particles were heated with heating steam while transferring them through the super heated steam-feeding region S by holding them between the belts 3 and 5. The line speed and steam pressure in the molding are shown collectively in Table 3. In this example, suction under reduced pressure was performed in the sucking sections 9 situated at the upstream and downstream sides of the super heated steam-feeding region.

TABLE 3

|  |  | Example 3 | Comp. Example 3 |
|---|---|---|---|
| Kind of base resin*5 |  | Uncrosslinked ethylene-propylene random copolymer | |
| Foamed particles before compression | Bulk density (g/cm³) | 0.041 | 0.041 |
|  | Internal air pressure of particles (atm) | 2.0 | 2.0 |
|  | Recovery factor from compression (%)*1 | 85 | 70 |
|  | Average weight of particles (mg/particle) | 1.8 | 1.8 |
|  | Presence of two peaks on DSC curve | Present | Present |
| Compression ratio of foamed particles (%) |  | 35 | 35 |

TABLE 3-continued

|  |  | Example 3 | Comp. Example 3 |
|---|---|---|---|
| Release factor of foamed particles from compression (%) |  | 250 | 250 |
| Molding conditions | Steam pressure (kg/cm²G) | 3.3 | 3.3 |
|  | Line speed (m/min) | 2.0 | 2.0 |
| Operating state of molding apparatus |  | Good without any leakage of steam | Operation was unstable due to intermittent leakage of steam |
| Properties of molded article | Fusion bonding property of foamed particles*2 | ○ | Short shot occurred periodically |
|  | Density (g/cm³) | 0.05 |  |
|  | Density ratio*3 | 0.82 |  |
|  | Appearance | Good | Poor |

(Note)
*5: A resin having a melting point of 148° C., an ethylene content of 2.4 wt. % and a melt flow rate (according to JIS K 6747-1981, paragraph 4.3) of 10 g/10 min.

COMPARATIVE EXAMPLE 3

Molding was conducted under the same conditions as in Example 3 except that foamed particles different in recovery factor from compression were used. The properties of the foamed particles used, molding conditions and the properties of the molded article obtained are shown collectively in Table 3.

As apparent from the results shown in Table 3, a molded article of good quality could be obtained without any problem in Example 3 making use of the foamed particles the recovery factor from compression of which exceeded 80%, while any molded article of good quality could not be obtained in Comparative Example 3 making use of the foamed particles the recovery factor from compression of which was lower than 80%, because short shot of the foamed particles occurred periodically.

EXAMPLE 4

Foamed particles shown in Table 4 were compressed in the same apparatus (dimensions of passageway C were fixed as follows: width between the position just after passed through the projections and the exit of the molded article from the cooling region B: 300 mm; height therebetween: 25 mm) as that illustrated in FIG. 1 so as to give a compression ratio shown in Table 4, and then released from the compression so as to give a release factor from compression shown in Table 4 (using projections of the type illustrated in FIG. 2). The thus-treated foamed particles were heated with heating steam while transferring them through the super heated steam-feeding region S by holding them between the belts 3 and 5. The line speed and steam pressure in the molding are shown collectively in Table 4. In this example, suction under reduced pressure was performed in the sucking sections 9 situated at the upstream and downstream sides of the super heated steam-feeding region.

TABLE 4

|  |  | Example 4 | Comp. Example 4 |
|---|---|---|---|
| Kind of base resin*6 | | Uncrosslinked linear low density polyethylene | |
| Foamed particles before compression | Bulk density (g/cm³) | 0.02 | 0.02 |
| | Internal air pressure of particles (atm) | 1.0 | 1.0 |
| | Recovery factor from compression (%)*1 | 95 | 95 |
| | Average weight of particles (mg/particle) | 2.0 | 2.0 |
| | Presence of two peaks on DSC curve | Present | Present |
| Compression ratio of foamed particles (%) | | 32 | 60 |
| Release factor of foamed particles from compression (%) | | 250 | 100 |
| Molding conditions | Steam pressure (kg/cm²G) | 1.4 | 1.5 |
| | Line speed (m/min) | 2.0 | 2.0 |
| Operating state of molding apparatus | | Good without any leakage of steam | Stably operated though great leakage of steam occurred |
| Properties of molded article | Fusion bonding property of foamed particles*2 | ◯ | ◯ |
| | Density (g/cm³) | 0.026 | 0.033 |
| | Density ratio*3 | 0.77 | 0.61 |
| | Appearance | Good | Good |

(Note)
*6: An uncrosslinked linear low density polyethylene composed of a random copolymer of 98.2 mol % of ethylene and 1.8 mol % of 4-methylpentene-1, i.e., a resin having a density of 0.929 g/cm³, a melting point of 124° C. and a melt flow rate (according to JIS K 6748-1981, paragraph 4.4) of 1.3 g/10 min.

COMPARATIVE EXAMPLE 4

Molding was conducted by using an apparatus having no compression-releasing means (i.e. an apparatus having no projection) and the same foamed particles as those used in Example 4 and selecting other molding conditions in such a manner that a molded article of good quality can be provided when the molding is conducted at the same line speed as in Example 4. The properties of the foamed particles used, molding conditions and the properties of the molded article obtained are shown collectively in Table 4.

As described above, the methods of the present invention have the following excellent effects compared with the conventional methods for producing expansion-molded articles by continuously molding foamed particles of a polyolefin resin.

(1) In the case where foamed particles having an internal air pressure substantially equal to the atmospheric pressure are used, any conventional method has required to use foamed particles having an expansion ratio considerably higher than the intended expansion ratio of the resulting molded article. According to the method of the present invention, however, the degree of reduction in expansion ratio of the resulting molded article compared with the expansion ratio of the original foamed particles can be made small, so that the expansion ratio of foamed particles used in molding can be preset low, thus leading to the improvement of productivity in the step of producing foamed particles.

(2) Even in the case where foamed particles, to which an internal air pressure has been applied, are used, according to the method of the present invention, a molded article having the intended expansion ratio can be obtained with foamed particles having an internal air pressure lower than that in the conventional method. Therefore, the time required to cool the molded article can be shortened, so that a molded article of good quality can be obtained without causing tertiary expansion (undesirable expansion of the molded article due to insufficient cooling) even when the line speed in the molding is increased, resulting in a great improvement in productivity. Since the internal air pressure of the foamed particles can be preset low, a pressurizing tank used for applying an internal air pressure may not have so high pressure resistance, and the time required to apply the internal air pressure may also be shortened.

(3) According to the method of the present invention, the compression applied to the foamed particles has been already removed in the heating region. Therefore, the heating steam fully reaches internally situated foamed particles compared with the method in which compressed foamed particles are heated as they are. As a result, the secondary expandability and fusion bonding property of the foamed particles are improved, so that molding with steam lower in pressure compared with the conventional method becomes feasible.

(4) Since a molded article having a high expansion ratio can be obtained in a state that the foamed particles have been compressed to a great extent to enhance steam-sealing property, the operating state of the molding apparatus can be improved because steam can be prevented from leaking out toward the particle-feeding region.

(5) Since productivity is improved to a great extent compared with the batch type molding process, and automatic molding also becomes feasible, production cost can be reduced to a great extent. Further, a molded article of continuous length, which has been difficult to be obtained by the conventional batch type molding process, can be produced, and the production of a composite panel obtained by laminating a synthetic resin film on the surface of the molded article can also be conducted continuously and efficiently, so that the production cost of a composite panel comprising, as a core, the molded article from the foamed particles of the polyolefin resin can also be reduced.

What is claimed is:

1. A method for continuously producing an expansion-molded article, which comprises feeding foamed particles between a belt continuously traveling along an upper surface within a passageway defined by structural members and having a rectangular form in section and a belt continuously traveling along a lower surface within the passageway, and then causing the foamed particles to successively pass through a super heated steam-feeding region wherein the foamed particles are heated with steam to mutually fusion-bond the foamed particles to form a molded article and a cooling region wherein the so-formed molded article is cooled within the passageway, said foamed particles being transferred to the super heated steam-feeding region after the foamed particles are compressed on the upstream side of the super heated steam-feeding region, and then released from a part or the whole of the compression, wherein the foamed particles used are foamed particles of a polyolefin resin and said foamed particles of a polyolefin resin having a recovery factor from compression of at least 80% said recovery factor from compression being defined by the following equation (1):

Recovery factor from compression (%)=$V_2/V_1 \times 100$   (1)

wherein

V₁ is the original bulk volume of the foamed particles, and

V₂ is a bulk volume of the foamed particles measured upon elapsed time of 10 seconds after the foamed particles are compressed to a bulk volume of 60% based on the original bulk volume, and the compressive force is then removed.

2. The method according to claim 1, wherein the foamed particles are compressed to a bulk volume of 10–60% based on the original bulk volume on the upstream side of the super heated steam-feeding region.

3. The method according to claim 1, wherein the compression applied to the foamed particles on the upstream side of the super heated steam-feeding region is removed in such a manner that a release factor from compression defined by the following equation (2):

$$\text{Release factor from compression } (\%) = b/a \times 100 \qquad (2)$$

wherein a is a sectional area of a space at the place where the foamed particle are most compressed on the upstream side of the super heated steam-feeding region, and b is a sectional area of an exit of the molded article from the cooling region, is at least 150%.

4. The method according to claim 1, wherein the area of a section of the passageway perpendicular to the direction, in which the foamed particles are transferred, is kept substantially constant on the downstream side from the starting point of the super heated steam-feeding region until the molded article is fully cooled.

5. The method according to claim 1, wherein steam and/or a drain within the passageway are sucked under reduced pressure on the upstream side of the super heated steam-feeding region, or on both upstream and downstream sides of the super heated steam-feeding region.

6. The method according to claim 1, wherein the bulk density of the foamed particles of the polyolefin resin as a raw material is 0.09–0.006 g/cm³.

7. The method according to claim 1, wherein the foamed particles of the polyolefin resin are foamed particles formed of an uncrosslinked polypropylene resin or uncrosslinked polyethylene resin as a base resin and having two endothermic peaks on a DSC curve obtained by their differential scanning calorimetry.

8. The method according to claim 1, wherein the upper and lower belts are so constructed that a space between them becomes narrower toward the direction of the passageway from the feeding side of the foamed particles, and the foamed particles fed between said belts are compressed while they are being transferred, released from a part or the whole of the compression by causing the foamed particles to pass through between inclined plates provided in such a manner that the space becomes wider toward the direction of the passageway, and then transferred to the super heated steam-feeding region.

9. The method according to claim 1, wherein at least one projection is provided before the super heated steam-feeding region, and the foamed particles are caused to pass through the projection part, whereby the foamed particles are compressed and released from the compression.

10. The method according to claim 9, wherein at least one projection is provided on each of the upper and lower sides before the super heated steam-feeding region with the positions of the projections staggered, and the foamed particles are caused to pass through the projection part, whereby the foamed particles are compressed and released from the compression.

11. The method according to claim 9, wherein a plurality of projections are alternately provided on the upper and lower sides before the super heated steam-feeding region in such a manner that the height of the projection becomes lower toward the direction of the super heated steam-feeding region from the feeding side of the foamed particles, and the foamed particles are caused to pass through the projection part, whereby the foamed particles are compressed and released from the compression.

12. The method according to claim 9, wherein a plurality of projections are alternately provided on the upper and lower sides before the super heated steam-feeding region in such a manner that the height of the projection becomes higher toward the direction of the super heated steam-feeding region from the feeding side of the foamed particles, and the foamed particles are caused to pass through the projection part, whereby the foamed particles are compressed and released from the compression.

13. The method according to claim 9, wherein a plurality of projections are alternately provided on the upper and lower sides before the super heated steam-feeding region in such a manner that the height of the projection becomes higher toward the direction of the super heated steam-feeding region from the feeding side of the foamed particles, a plurality of projections are then alternately provided on the upper and lower sides in such a manner that the height of the projection becomes lower toward the direction of the super heated steam-feeding region from the feeding side of the foamed particles, and the foamed particles are caused to pass through the projection parts, whereby the foamed particles are compressed and released from the compression.

14. The method according to claim 1, wherein the foamed particles are compressed and released from the compression by at least one press roll provided before the super heated steam-feeding region.

15. The method according to claim 1, wherein the foamed particles are compressed by a screw feeder having a screw the pitch of which becomes narrower toward the tip, and then released from the compression by widening the space through which the foamed particles pass.

16. A method for continuously producing an expansion-molded article, which comprises: feeding foamed particles of a polyolefin resin to a super heated steam-feeding region wherein said foamed particles are heated with steam to mutually fusion-bond the foamed particles to form a molded article and then feeding said so-formed molded article to a cooling region wherein the so-formed molded article is cooled; said foamed particles being heated with said steam after the foamed particles have been compressed prior to said steam heating, and then released from a part or the whole of the compression; wherein said foamed particles of a polyolefin resin have a recovery factor from compression of at least 80%; said recovery factor from compression being defined by the following equation (1):

$$\text{Recovery factor from compression } (\%) = V_2/V_1 \times 100 \qquad (1)$$

wherein

V₁ is the original bulk volume of the foamed particles, and

V₂ is a bulk volume of the foamed particles measured upon elapsed time of 10 seconds after the foamed particles are compressed to a bulk volume of 60% based on the original bulk volume, and the compressive force is then removed.

17. The method according to claim 16, wherein the foamed particles are compressed to a bulk volume of 10–60% based on the original bulk volume prior to said steam heating.

* * * * *